Oct. 14, 1958 W. H. LYON 2,856,462

HEAD DRUM ASSEMBLY FOR MAGNETIC TAPE

Filed Oct. 3, 1955 4 Sheets-Sheet 1

INVENTOR.
WILLIAM H. LYON
BY
H. G. Manning
ATTORNEY

Oct. 14, 1958 W. H. LYON 2,856,462

HEAD DRUM ASSEMBLY FOR MAGNETIC TAPE

Filed Oct. 3, 1955 4 Sheets-Sheet 2

INVENTOR.
WILLIAM H. LYON
BY
H. G. Manning
ATTORNEY

HEAD DRUM ASSEMBLY FOR MAGNETIC TAPE

Filed Oct. 3, 1955

INVENTOR.
WILLIAM H. LYON
BY
H. G. Manning
ATTORNEY

Oct. 14, 1958 W. H. LYON 2,856,462

HEAD DRUM ASSEMBLY FOR MAGNETIC TAPE

Filed Oct. 3, 1955 4 Sheets-Sheet 4

INVENTOR.
WILLIAM H. LYON
BY
H. G. Manning
ATTORNEY

United States Patent Office 2,856,462
Patented Oct. 14, 1958

2,856,462

HEAD DRUM ASSEMBLY FOR MAGNETIC TAPE

William H. Lyon, Orange, Conn., assignor to The Sound-Scriber Corporation, New Haven, Conn., a corporation of Connecticut Application October 3, 1955, Serial No. 538,151
11 Claims. (Cl. 179—100.2)

This invention relates to sound recording and reproducing, and more particularly to a long playing dictating apparatus with interrupted magnetic tracks in which the sound is recorded on a wide slowly moving flexible strip of tape coated on one side with an emulsion of magnetic particles.

One object of the present invention is to provide a dual recording and reproducing apparatus of the above nature, wherein two sets of interrupted successive straight sound tracks may be alternately impressed laterally across a moving tape at a slight angle to the length of said tape by a pair of rotating drums, each drum carrying a plurality of magnetic transducer heads located on a horizontal axis beneath said tape.

A further object is to provide an apparatus of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

Figure 1:
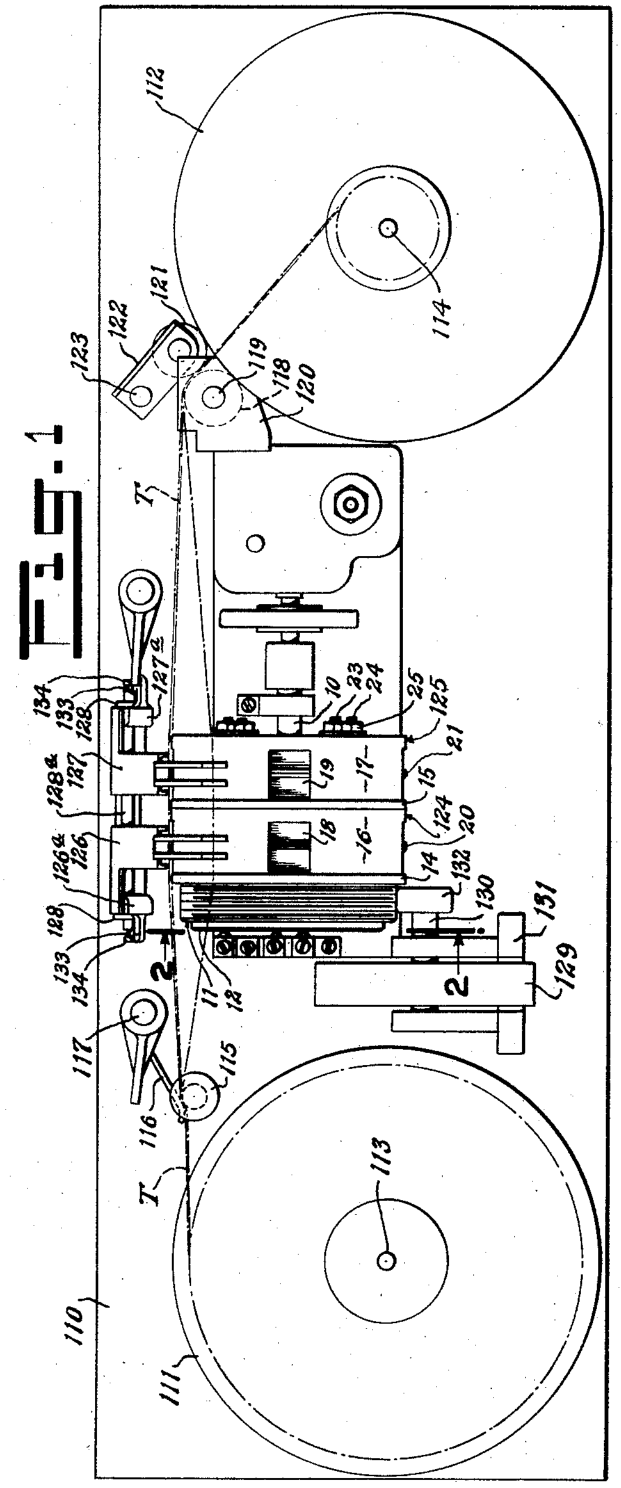
Fig. 1 represents a side view of a magnetic recording apparatus embodying the present invention.
Figure 3:
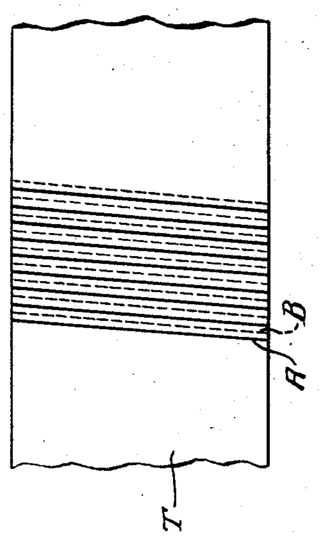
Fig. 3 is a plan view of a portion of the magnetic tape, showing the two sets of interrupted alternated sound recording tracks corresponding to a pair of channels which are to be simultaneously recorded or reproduced.
Figure 2:
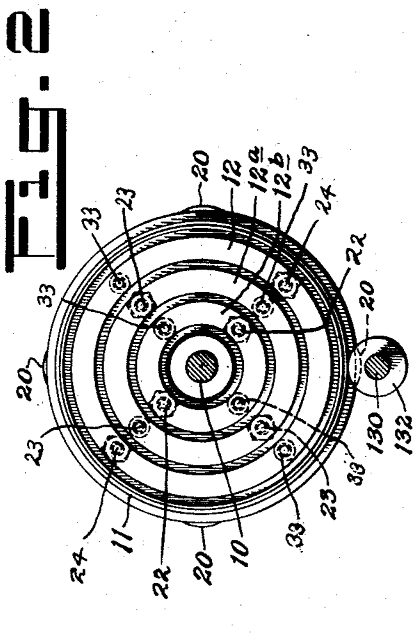
Fig. 2 is a cross-sectional view of the end of the recording head drum taken along the line 2—2 of Fig. 1.
Figures 4, 5:
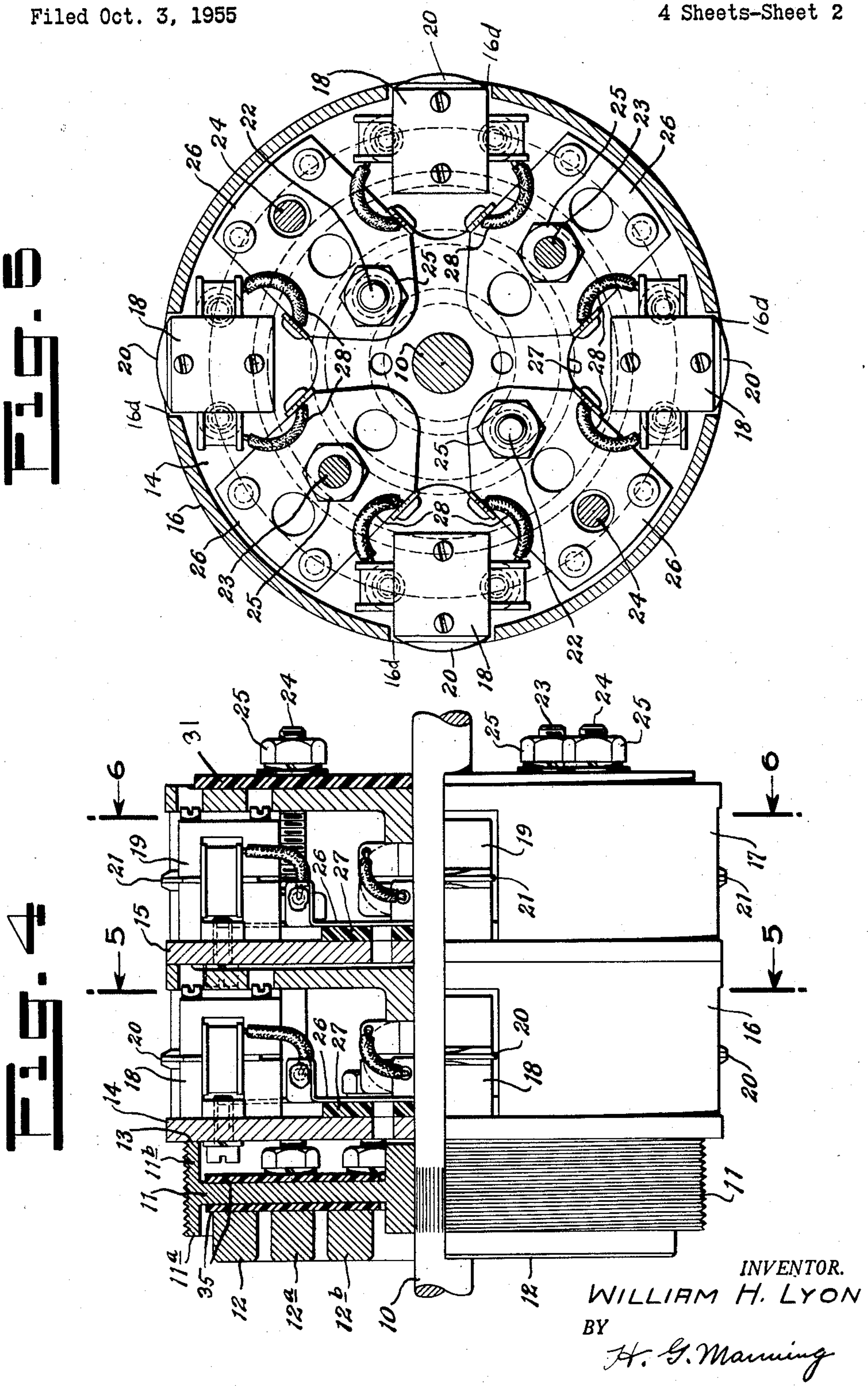
Fig. 4 is a side view of the transducing means, the top part thereof being shown in section to illustrate the construction of the recording heads and slip rings.
Fig. 5 is a cross-sectional view, taken along the line 5—5 of Fig. 4.
Figures 6, 7:
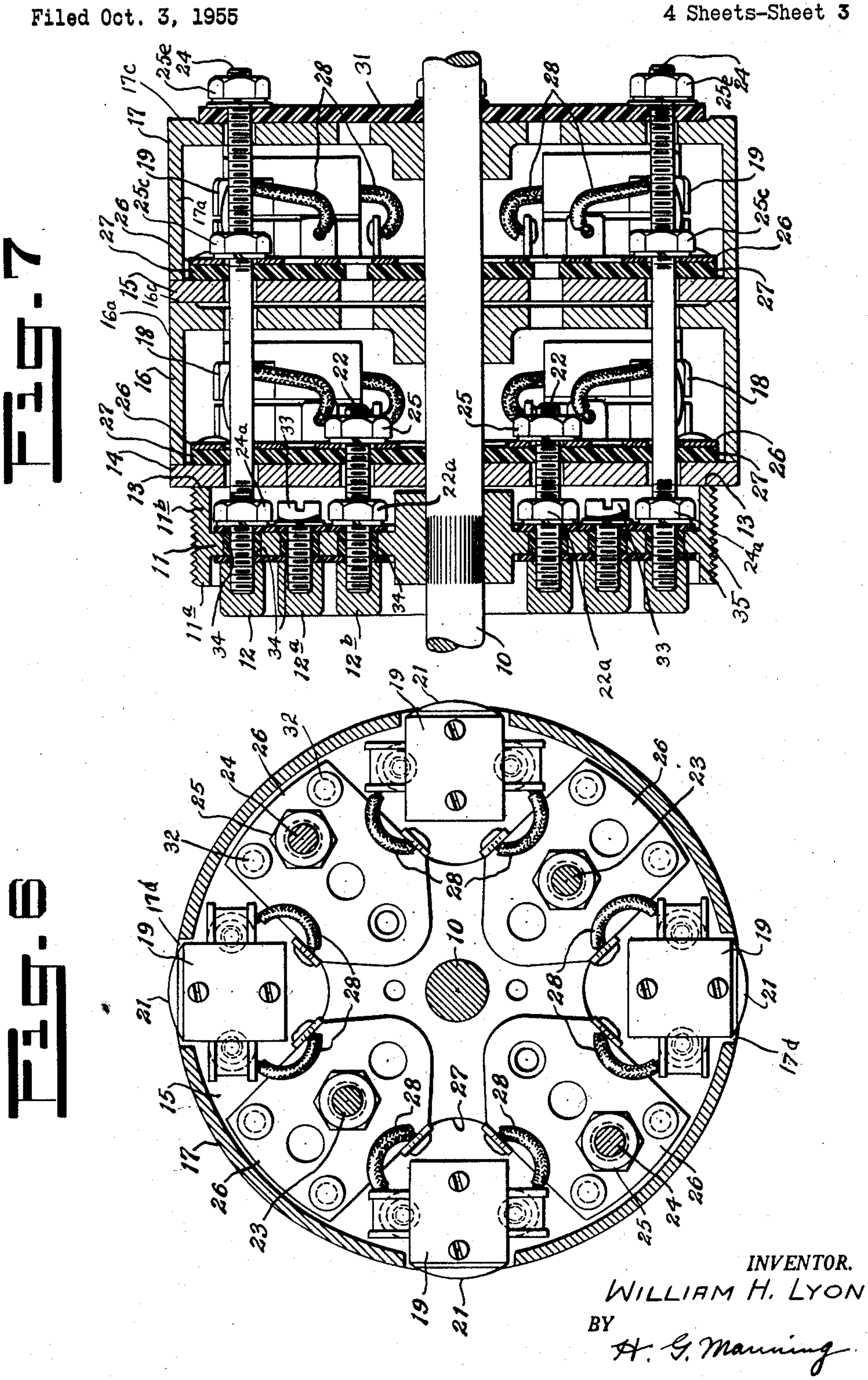
Fig. 6 is a cross-sectional view taken along the line 6—6 of Fig. 4.
Fig. 7 is a cross-sectional view taken along the line 7—7 of Fig. 9.
Figure 8:
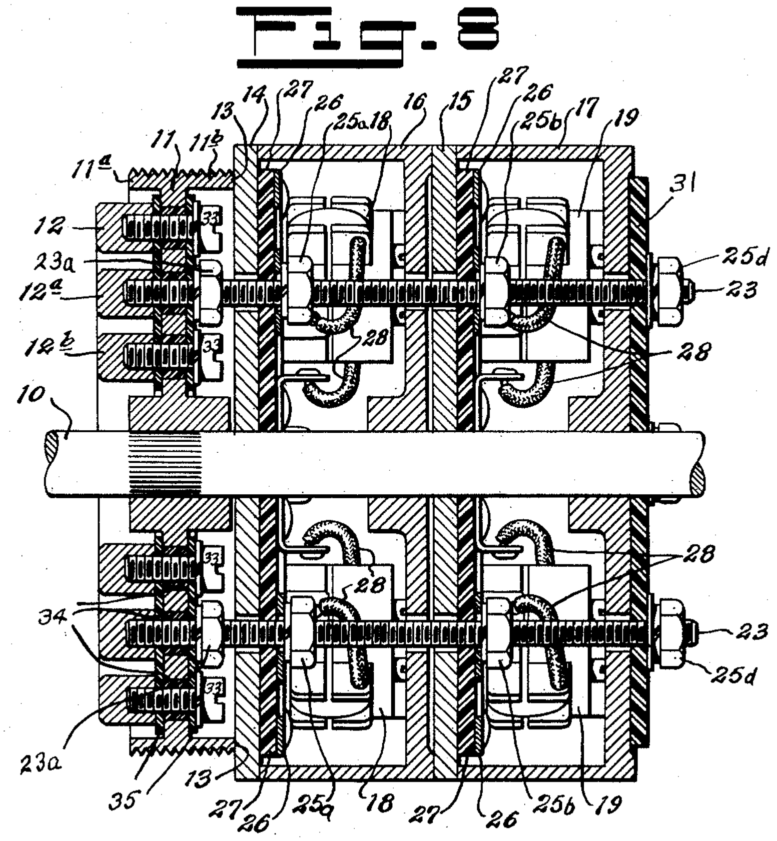
Fig. 8 is a cross-sectional view taken along the line 8—8 of Fig. 9.
Figure 9:
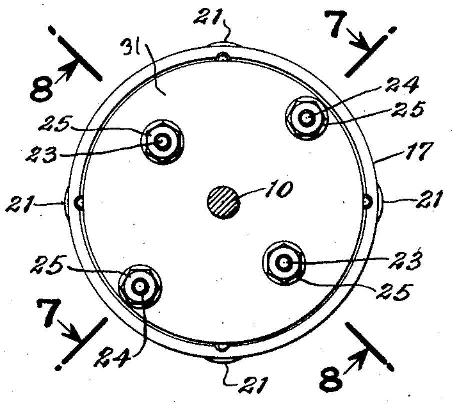
Fig. 9 is an end view of the transducing means of Fig. 8, shown on a smaller scale.

The present invention relates to an improvement over the invention disclosed in the co-pending application of William H. Lyon, Serial No. 406,517, filed January 27, 1954, entitled Transverse Interrupted Track Magnetic Recorder With Transducer Head Drum on Horizontal Axis.

In the present apparatus, the sound tracks are adapted to be generated on the tape by two sets of four uniformly spaced transducer heads which project through the outer rims of a pair of spaced rotating drums mounted on a horizontal axis beneath said tape. The size of the drums will be such that when one head is just leaving one edge of the tape, another head will be just reaching the other edge of said tape. By means of a pair of concave holding shoes, the tape will be curved to closely embrace the tips of the transducer heads on the cylindrical drums.

Referring now to the drawings, in which like reference numerals denote corresponding parts throughout the several views, the numeral 110 indicates a vertical chassis base plate on which the apparatus is mounted, provision being made of a feed reel 111 mounted on the left-hand side of said base plate, which reel will hold up to twenty-four hours recording of a tape T coated on its lower side with an emulsion of magnetic particles.

A take-up reel 112 of the same size as the feed reel 111 is located on the right-hand side of the base plate 110.

The feed reel 111 is secured on a horizontal spindle 113 by means of a crank handle (not shown), and the take-up reel 112 is similarly secured on a spindle 114 by a similar crank handle, not shown.

After the tape T leaves the feed reel 111, it will pass over a tape guide drum 115 against which it is pressed by a tape tension shoe 116 pivoted on a pin 117.

The tape T then passes through the recording part of the apparatus and thence over a drive roller 118 mounted on a horizontal shaft 119 supported by a bracket 120.

The tape T is held in firm contact with the drive roller 118 by means of a pressure roller 121 which is mounted on an arm 122 pivoted on a pin 123.

At an intermediate point between the guide drum 115 and the drive roller 118, the tape T is pressed firmly against the periphery of a pair of transducing means comprising cylindrical revolving drums 124, 125, by a pair of tape holding and guiding shoes 126, 127 pivotally mounted on a pair of pins 128*a* supported in the brackets 128. Secured to the shoes 126, 127 are spring pressure arms 126*a* and 127*a* respectively which are connected to the coil springs 133 anchored on the pins 134. The drums 124, 125 are rigidly mounted on a shaft 10, and rotate therewith.

The tape holding shoes 126, 127 are provided with concave bottom recesses the radius of which is the same as the radius of the outside edge of the tape T when it is fitted closely upon the periphery of the drums 124, 125.

The tape T will thus be caused to closely embrace the tips of two sets of four circumferentially equidistant magnetic transducer heads 18 and 19 extending through the drums 124, 125.

The grooves in the shoes 126, 127 permit the tape to flex around the tips of the transducer heads 18, 19, and thereby produce resilient yieldable contact therewith.

The head holding drums 124, 125 are stabilized by a flywheel 129, which runs several times as fast as the speed of said drums. The flywheel 129 is mounted on a shaft 130 which revolves in a U-shaped bracket 131 secured to the base of the chassis plate 110.

On the end of the shaft 130, provision is made of a soft rubber wheel 132 which engages a helical grooved ring 11 rigidly mounted on the shaft 10 to provide a positive contact with the rubber wheel 132.

The grooved ring 11 has two flanges 11*a*, 11*b* within the first of which are three concentric slip rings 12, 12*a*, 12*b*, which provide electrical connections for the rotating assembly.

The ring 11 is provided on its inner end with a radial side reference surface 13, located exactly at right angles to the shaft 10.

In order to permit easy replacement of the magnetic heads 18, 19, as they wear out, the operating parts of the assembly are detachable from and can slide off readily from the shaft 10.

The detachable components include a pair of head mounting wafers 14 and 15 which are identical in construction, upon which the sets of magnetic heads 18, 19 are accurately mounted so that their pole tips 20 are spaced equidistantly about the periphery of said wafers.

In addition, there are provided a pair of spacer shells 16 and 17 having cylindrical exterior surfaces 16*a* and 17*a* provided with suitably disposed slots 16*d* and 17*d* through which the pole tips 20, 21 project. The spacer shells 16 and 17 are also provided with radial side reference surfaces 16*c* and 17*c* disposed exactly at right angles to the shaft 10 similar to the reference surface 13 of the ring 11.

Also included are the cross-shaped insulating disks 27 and a circular insulating disk 31.

Each of the arms of the insulating disks 27 are provided with a contact sector plate 26 which may be attached thereto by means of rivets 32.

To assemble the dual channel apparatus, the slip rings 12 are first attached to the grooved ring 11 by means of the short bolts 33 which extend through insulating inserts 34 disposed in openings in the web of the ring 11. The bolts 33 and the slip rings 12 are also insulated from the ring 11 by means of the insulating disks 35. A pair of short studs 22 are then threaded into diagonally opposite openings in the slip rings 12*b*, which studs extend through the insulating disks 35 and the inserts 34 and being provided with nuts 22*a*. Another pair of somewhat longer studs 24 are similarly threaded into suitable openings provided in the slip ring 12 and insulated from the ring 11 by the inserts 34 and insulating disks 35. These studs are held in place by the nuts 24*a*, and the studs 23 which are of the same length as the studs 24 are then inserted into suitable openings in the slip ring 12*a*—said studs being located on a diagonal at right angles to the diagonal line of studs 22 and 24. The studs 23 are secured to the ring 11 by nuts 23*a* and are insulated from the ring 11 by inserts 34 and insulating disks 35. The innermost wafer 14 and one of the cross-shaped insulating disks 27 are then placed on the shaft 10 so that the wafer 14 abuts against the reference surface 13 of the ring 11.

The wires 28 leading from the transducer heads 19 may be connected to the contact plates 26, either before or after the wafer 14 and the insulating disk 27 have been installed—these last named elements being retained securely by nuts 25*a* threaded on the studs 23. With the nuts 25*a* tightened, the spacer 16 will be placed on the shaft 10 so as to abut against the wafer 14, after which the second wafer 15 together with another of the cross-shaped insulating disks 27 is put on the shaft 10.

As in the first instance, the wires 28 from the transducer heads 19 may be attached to the contact plates 26 of the second insulating disk 27, either before or after the assembly is made. These elements are held snugly in place by means of nuts 25*b* threaded on studs 23, and also by the nuts 25*c* threaded on the studs 24. After this, the second spacer shell 17 is placed on the shaft 10, together with a circular insulating disk 31, these two elements being retained by nuts 25*d* threaded on studs 23 and the nuts 25*e* threaded on the studs 24.

It will be obvious from the above description that if only a single channel of recording or reproducing is to be used, a circular insulating disk 31 could be placed over the end of the first spacer shell 16 and also that if additional channels are required, additional assemblies of wafer disks, such as 14 or 15, and spacer shells 16 or 17 may be added.

The center slip ring 12*a* is electrically common. The inner ring 12*b* is connected to the first set of heads 18 corresponding to the channel A, while the outer ring 12 is connected to the heads 19 of the channel B, which is to be simultaneously recorded and reproduced with channel A. The connection from the common center slip ring 12*a* to both sets of the heads 18, 19 is made electrically through the studs 23. The circuit is completed to the first set of heads 18 by the studs 22, and to the second set of heads 19 by the studs 24.

When the nuts 25 are attached in position, the electrical connections are automatically made through the contact plates 26 to the proper slip rings 12, 12*a*, 12*b*.

It will be understood that the design of the head wafers 14 and 15 is such that the connections will automatically be made to the proper slip rings 12, 12*a*, 12*b*, whenever the wafers 14 and 15 are slid into position, for recording channel A and channel B, respectively.

The spacer shells 16 and 17 provide enclosures for both sets of heads 18 and 19, and furnish a smooth riding surface for the underside of the tape.

The mechanism for recording and reproducing intelligence simultaneously in transverse paths on a single tape is more particularly described and claimed in my copending application Ser. No. 540,938, filed October 17, 1955, entitled "Dual Channel Magnetic Tape Recorder."

While there has been disclosed in this specification, one form in which the invention may be embodied in practice, it is to be understood that this form is shown for the purpose of illustration only, and that the invention is not to be limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an apparatus for recording intelligence upon and reproducing it from a movable, flexible coated magnetic tape passing from a feed reel to a take-up reel mounted on a chassis, a pair of drums mounted on a horizontal shaft, each of said drums including a wafer disk rigidly secured to said shaft and carrying a set of spaced transducer heads, and a spacer shell also rigidly secured to said shaft and embracing said wafer disk and transducer heads, and a helically grooved reference ring also rigid on said shaft and enclosing a plurality of slip rings concentrically located within said reference ring, and a soft rubber wheel engaging said grooves to filter out flutter in the driving mechanism.

2. The invention as defined in claim 1, in which said wafers and spacer shells are detachably connected together as a unit by sets of horizontal studs spaced at different radial distances from said shaft.

3. The invention as defined in claim 2, in which said wafers and shells are locked upon said unit by nuts screwed on the ends of said studs.

4. The invention as defined in claim 1, in which said transducer heads are connected to a plurality of radial conductive plates mounted on said wafer disks.

5. The invention as defined in claim 4, in which said conductive plates are secured to cross-shaped insulating disks secured rigidly on said wafer disks.

6. The invention as defined in claim 1, in which said reference ring has a radial inner edge for accurately locating the adjacent end wafer disk with respect to said shaft, at 90 degrees thereto.

7. In a transducer means wherein a plurality of transducer heads are arranged for rotation in circular paths disposed transversely with respect to the path of movement of a magnetic tape, the combination comprising a rotatable drive shaft, a circular drive member fixed to said shaft, a plurality of circular head mounting members slidably received on said drive shaft, a plurality of transducer heads secured in circumferential spaced relation about said mounting members, a plurality of annular spacer members disposed between adjacent ones of said head mounting members and having arcuate surfaces extending between circumferentially adjacent ones of said transducer heads, a plurality of slip rings concentrically arranged with respect to said drive shaft, and means to attach said spacer members, said slip rings and said head mounting members to said drive member for rotation therewith, including means to orient said head mounting members with respect to each other, said attaching means comprising means for making electrical connection between said transducer heads and said slip rings.

8. The invention defined in claim 7, wherein said attaching means further includes longitudinally extending stud means connected at one end to said radially extending drive member, and wherein said means to orient said head mounting members includes an opening provided in each of said head mounting members through which said stud means may be received.

9. In transducer means wherein a plurality of transducer heads are arranged for rotation in circular paths disposed transversely with respect to the path of movement of magnetic tape, the combination comprising a rotatable drive shaft, a plurality of concentrically arranged electrical slip rings, means to support said plurality of concentric slip rings affixed to said shaft for rotation therewith, a plurality of transducer heads, a plurality of head mounting members each supporting a plurality of said transducer heads and adapted to be slidably received on said drive shaft, each of said head mounting members including electrical contact plates electrically connected to said transducer heads, a cylindrical shell member having an arcuate surface extending between circumferentially adjacent ones of said transducer heads and coaxially disposed on said drive shaft, and means to attach said head mounting member and said shell member for rotation with said drive shaft, said attaching means being operative to establish an electrical circuit between said slip rings and said contact plates for connecting to said transducer heads.

10. The invention as claimed in claim 9 wherein said concentric slip ring members are radially spaced on a disk-shaped member attached to said drive shaft, and said means to attach said last mentioned member to said drive shaft includes stud members extending parallel to said drive shaft and in electrical contact with a slip ring and a contact plate.

11. The invention as defined in claim 10, wherein said plurality of head mounting members are axially spaced on a drive shaft, said head mounting members being provided with openings through which said stud members may pass, a stud member connected to one concentric slip ring having an electrical connection with the radially extending contact plate of only one of said head mounting members, a stud member on another of said concentric slip rings having an electrical connection with a radially extending contact plate of another one of said head mounting members.

References Cited in the file of this patent

UNITED STATES PATENTS

| | | |
|---|---|---|
| 2,245,286 | Marzocchi | June 10, 1941 |
| 2,352,023 | Schuller | June 20, 1944 |
| 2,648,589 | Hickman | Aug. 11, 1953 |
| 2,743,318 | De Forest | Apr. 24, 1956 |